Patented May 16, 1933

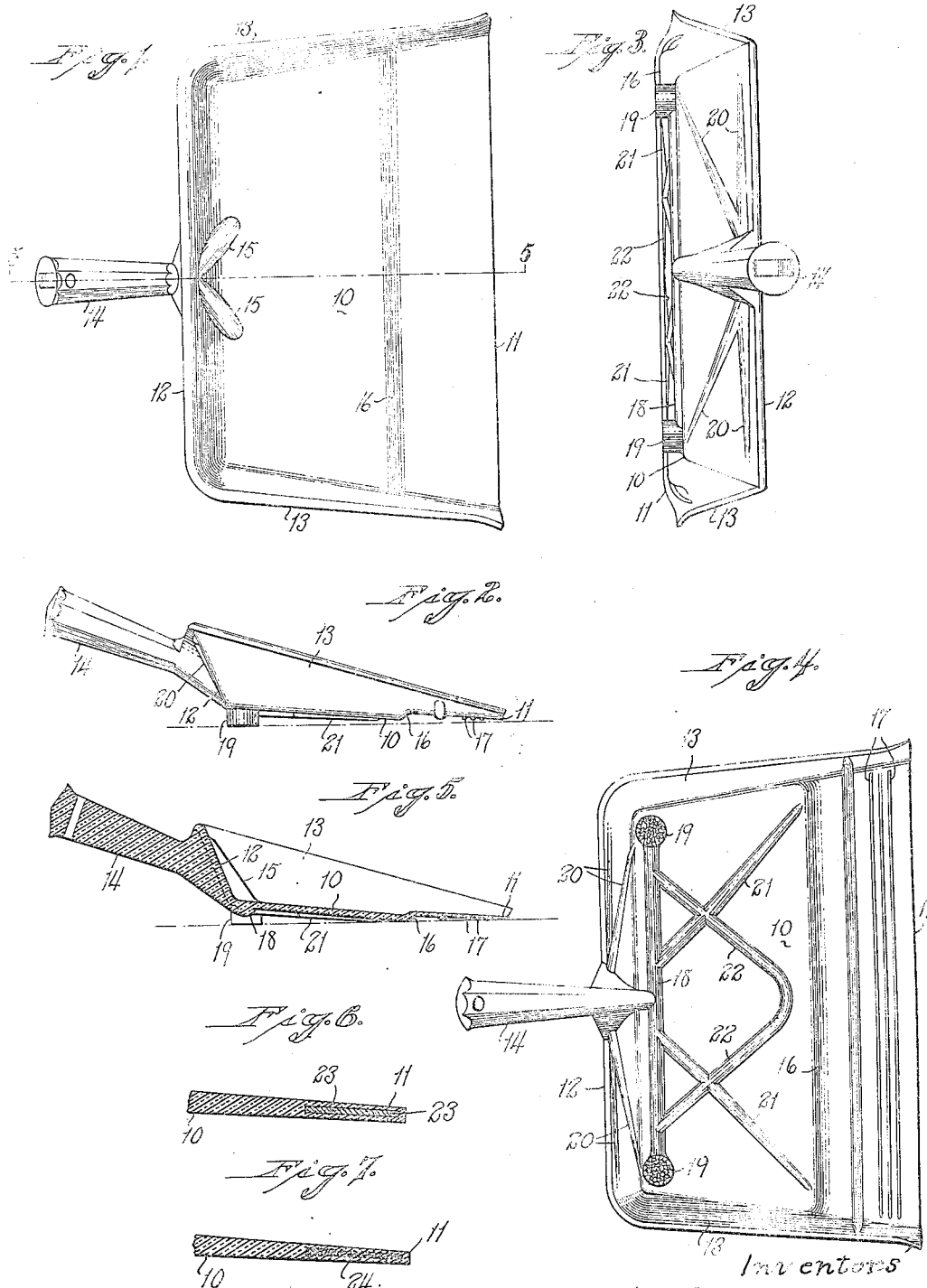

1,908,730

UNITED STATES PATENT OFFICE

JAMES R. CALDWELL AND MADELEINE L. CALDWELL, OF NORTON, MASSACHUSETTS

DUSTPAN

Application filed October 3, 1932. Serial No. 635,956.

This invention relates to improvement in dustpans such as are commonly formed from tin. In the use of such dustpans, it is necessary, when sweeping material onto the pan, to hold the pan in position, and in the use of tin dustpans the lip becomes bent, so that it does not lie flat upon the floor, thus necessitating considerable manipulation in order to sweep material onto the pan. The object of this invention is to provide a pan which will remain in position and which has a lip which will lie flat upon the floor, and the invention consists in forming the pan from rubber suitably reinforced to give the necessary strength, and provided with means for positioning it upon the floor, so that the lip will lie flat thereupon, and the invention also consists in a construction as will be hereinafter described and particularly recited in the claims.

In the accompanying drawing:

Fig. 1 is a plan view of a dustpan constructed in accordance with our invention;

Fig. 2 is a side view of the same;

Fig. 3 is a rear view of the same;

Fig. 4 is an underside view of the same;

Fig. 5 is a sectional view on the line 5—5 of Fig. 1;

Fig. 6 is an enlarged sectional view of the lip portion shown as reinforced with rubber impregnated fabric; and Fig. 7 is a similar view showing the lip reinforced with ground rag fiber.

In carrying out our invention, we form a dustpan of the usual design of tin dustpans and comprising a body portion 10 terminating in a lip 11 and provided with a back 12 and sides 13 which taper toward the lip. The back 12 is also provided with the usual handle 14, the entire device being molded from rubber. To reinforce the back, ribs 15 are provided which merge in the body portion 10. Between the body and the lip portion is a shoulder 16, over which material may be swept so as to be held in the body, and the underside of the lip will also be formed with narrow gripping-ribs 17. To provide additional strength, a transverse reinforcing rib 18 will be formed on the underside of the body, adjacent to the rear wall 12 and at each end of this rib is a foot 19 preferably roughened on its under surface so as to grip the floor. The back is further reinforced by ribs 20 and the underside of the body reinforced by crossed ribs 21 and 22. These ribs start from the rib 18, and the ribs 21 cross the rib 22, which is of loop shape. To further reinforce the lip, a strip of rubber impregnated fabric 23 may be molded into the lip portion, as shown in Fig. 6 of the drawing, or this fabric may be replaced by ground rag fiber 24 incorporated into the lip, as shown in Fig. 7 of the drawing.

This pan is readily molded from rubber and the lip cannot be permanently bent so as to interfere with the lip lying flat upon the floor. The feet 19 tilt the pan to the desired angle, and owing to the character of the material, the pan will remain in position upon the floor so that it is only necessary to lay it upon the floor where material may be swept into it without manually holding the pan in position.

In the normal position, the under edge of the lip is slightly below the under edge of the forward portion of the pan adjacent to the shoulder 16, but when placed upon the floor, the weight of the material will bring the pan down upon the floor, thus applying pressure to the outer edge of the lip against the surface of the floor, as shown in Fig. 5 of the drawing.

As before stated, these pans may be readily molded from rubber or equivalent flexible material and, therefore, produced at a comparatively low cost for manufacture, and thus avoid all the objections present in tin dustpans, and they may be produced in any desired color.

We claim:

1. A dustpan formed entirely from flexible rubber and comprising a body having a smooth upper surface, a lip, and a handle, a transverse reinforcing rib at the rear of the under side of the body, and a foot at each end of said rib, said rib and feet being integral with the pan.

2. A dustpan formed entirely from flexible rubber and comprising an integral body having a smooth upper surface, a lip, and a handle, a transverse reinforcing rib at the rear of the under side of the body and integral therewith, a foot at each end of said rib and integral with the body, and integral reinforcing ribs upon the under face of the body.

In testimony whereof, we have signed this specification.

JAMES R. CALDWELL.
MADELEINE L. CALDWELL.